United States Patent
Wojtalik et al.

(10) Patent No.: US 11,142,239 B2
(45) Date of Patent: Oct. 12, 2021

(54) STEERING COLUMN ASSEMBLY

(71) Applicant: TRW Steering Systems Poland SP Z.O.O., Czechowice-Dziedzice (PL)

(72) Inventors: Artur Wojtalik, Katowice (PL); Pawel Ponikiewski, Pewel Mala (PL)

(73) Assignee: ZF Steering Systems Poland Sp. Z.o.o., Czechowice-Dziedzice (PL)

( * ) Notice: Subject to any disclaimer, the term of this patent is extended or adjusted under 35 U.S.C. 154(b) by 228 days.

(21) Appl. No.: 16/315,740

(22) PCT Filed: Jul. 5, 2017

(86) PCT No.: PCT/EP2017/066814
§ 371 (c)(1),
(2) Date: Jan. 7, 2019

(87) PCT Pub. No.: WO2018/007463
PCT Pub. Date: Jan. 11, 2018

(65) Prior Publication Data
US 2019/0225256 A1    Jul. 25, 2019

(30) Foreign Application Priority Data

Jul. 7, 2016 (EP) ..................................... 16461536
Mar. 31, 2017 (GB) ..................................... 1705272

(51) Int. Cl.
*B62D 1/19*         (2006.01)

(52) U.S. Cl.
CPC .................................. *B62D 1/195* (2013.01)

(58) Field of Classification Search
CPC .................................. B62D 1/19; B62D 1/195
See application file for complete search history.

(56) References Cited

U.S. PATENT DOCUMENTS 3,373,965 A * 3/1968 Bien ...................... B62D 1/192
                                                        248/205.1
3,479,080 A * 11/1969 Hilfiker .................... B62D 1/19
                                                         296/35.2

(Continued)

FOREIGN PATENT DOCUMENTS

EP           1479592 A1     11/2004
JP          H0459572 U      5/1992

(Continued)

OTHER PUBLICATIONS

PCT International Search Report and Written Opinion, Application No. PCT/EP2017/066814, dated Sep. 11, 2017.

(Continued)

*Primary Examiner* — Paul N Dickson
*Assistant Examiner* — Timothy Wilhelm
(74) *Attorney, Agent, or Firm* — Robert James Harwood

(57) ABSTRACT

A steering column assembly is provided that is secured to a vehicle body and includes a mounting bracket securable to the vehicle body and a support bracket secured to a steering column shroud. A breakaway capsule assembly with a frangible connector secures the support bracket to the mounting bracket, the frangible connector, in use, breaking to allow relative movement of the support bracket and the mounting bracket, in the event of a crash. The breakaway capsule assembly includes a fixing portion that overlaps and supports a corresponding portion of the support bracket, the fixing portion including an opening which is aligned with a corresponding opening in the support bracket, the frangible connector passing through and engaging the two aligned openings. A spring biases the fixing portion and the support bracket into engagement with each other to oppose any movement between the fixing portion and the support (Continued)

bracket in the axial direction of the frangible connector during use of the steering assembly.

20 Claims, 5 Drawing Sheets

(56) References Cited

U.S. PATENT DOCUMENTS

| | | | | |
|---|---|---|---|---|
| 3,747,427 | A * | 7/1973 | Milton | B62D 1/195 74/492 |
| 3,868,864 | A * | 3/1975 | Durkee | B62D 1/195 74/492 |
| 4,884,778 | A * | 12/1989 | Yamamoto | B62D 1/195 248/548 |
| 4,943,028 | A * | 7/1990 | Hoffmann | B62D 1/195 188/376 |
| 5,605,073 | A * | 2/1997 | Milton | B62D 1/195 248/548 |
| 5,704,641 | A * | 1/1998 | Shimizu | B62D 1/184 188/371 |
| 5,788,279 | A * | 8/1998 | Pfannebecker | B62D 1/195 280/777 |
| 5,899,116 | A * | 5/1999 | Armstrong | B62D 1/195 188/376 |
| 5,954,363 | A * | 9/1999 | Cymbal | B62D 1/195 280/777 |
| 6,062,100 | A * | 5/2000 | Sarsfield | B62D 1/195 188/376 |
| 6,176,151 | B1 * | 1/2001 | Cymbal | B62D 1/195 280/777 |
| 6,273,468 | B1 * | 8/2001 | Bohner | B62D 1/185 280/775 |
| 6,392,703 | B1 * | 5/2002 | Uchino | H04N 5/2254 348/373 |
| 6,431,601 | B2 * | 8/2002 | Maekawa | B62D 1/192 180/443 |
| 6,439,607 | B1 * | 8/2002 | Jurik | B62D 1/195 280/777 |
| 6,530,600 | B1 * | 3/2003 | Marxer | B62D 1/195 280/777 |
| 6,655,715 | B2 * | 12/2003 | Anspaugh | B62D 1/195 280/777 |
| 6,659,504 | B2 * | 12/2003 | Riefe | B62D 1/184 280/775 |
| 6,799,486 | B2 * | 10/2004 | Manwaring | B62D 1/195 280/777 |
| 6,851,712 | B2 * | 2/2005 | Park | B62D 1/195 280/775 |
| 6,932,387 | B2 * | 8/2005 | Laisement | B62D 1/195 248/900 |
| 7,178,834 | B2 * | 2/2007 | Li | B62D 1/195 280/777 |
| 7,228,755 | B2 * | 6/2007 | Armstrong | B62D 1/195 280/777 |
| 7,261,014 | B2 * | 8/2007 | Arihara | B62D 1/181 74/493 |
| 7,360,793 | B2 * | 4/2008 | Hoshino | B62D 1/195 280/777 |
| 7,367,588 | B2 * | 5/2008 | Yamada | B62D 1/195 188/371 |
| 7,455,320 | B2 * | 11/2008 | Imamura | B62D 1/195 280/777 |
| 8,033,574 | B2 * | 10/2011 | Menjak | F16F 7/123 280/777 |
| 8,161,839 | B2 * | 4/2012 | Warashina | B62D 1/181 74/493 |
| 8,430,428 | B2 * | 4/2013 | Tinnin | B62D 1/195 280/779 |
| 8,485,554 | B2 * | 7/2013 | Osuka | B62D 1/195 280/777 |
| 8,544,887 | B2 * | 10/2013 | Fujiwara | B62D 1/195 280/777 |
| 8,562,020 | B2 * | 10/2013 | Arakawa | B62D 1/195 280/777 |
| 8,651,526 | B2 * | 2/2014 | Nakamura | B62D 1/195 280/777 |
| 8,678,436 | B2 * | 3/2014 | Duffy | B62D 1/195 280/777 |
| 8,764,064 | B2 * | 7/2014 | Riefe | B62D 1/195 280/777 |
| 8,887,596 | B2 * | 11/2014 | Uesaka | B62D 1/195 74/493 |
| 8,985,629 | B2 * | 3/2015 | Hattori | B62D 1/184 280/777 |
| 9,010,806 | B2 * | 4/2015 | Tanaka | B62D 1/195 280/777 |
| 9,346,482 | B2 * | 5/2016 | Tanaka | B62D 1/195 |
| 9,399,483 | B2 * | 7/2016 | Okada | F16M 13/02 |
| 9,566,997 | B2 * | 2/2017 | Fujiwara | B62D 1/195 |
| 9,637,161 | B2 * | 5/2017 | Orihara | B62D 1/195 |
| 9,751,554 | B2 * | 9/2017 | Sakuda | B62D 1/195 |
| 9,988,070 | B2 * | 6/2018 | Chiba | B62D 1/195 |
| 9,994,248 | B2 * | 6/2018 | Yamada | B62D 1/184 |
| 10,093,341 | B2 * | 10/2018 | Johta | B62D 1/192 |
| 10,160,475 | B2 * | 12/2018 | Uesaka | B62D 1/189 |
| 10,202,140 | B2 * | 2/2019 | Tanaka | B62D 1/192 |
| 10,220,871 | B2 * | 3/2019 | Tanaka | B62D 1/195 |
| 10,654,513 | B2 * | 5/2020 | Dite | B62D 1/184 |
| 10,676,125 | B2 * | 6/2020 | Dite | B62D 1/184 |
| 2003/0000330 | A1 * | 1/2003 | Murakami | B62D 1/195 74/492 |
| 2004/0057786 | A1 * | 3/2004 | Heiml | B62D 1/184 403/373 |
| 2007/0272049 | A1 * | 11/2007 | Eggers | B62D 1/195 74/493 |
| 2008/0238070 | A1 * | 10/2008 | Bodtker | B62D 1/195 280/777 |
| 2009/0090210 | A1 * | 4/2009 | Menjak | B62D 1/195 74/492 |
| 2011/0006509 | A1 * | 1/2011 | Tinnin | B62D 1/195 280/779 |
| 2014/0150594 | A1 * | 6/2014 | Riefe | B62D 1/195 74/492 |
| 2017/0106897 | A1 * | 4/2017 | Potzl | B62D 1/195 |
| 2019/0359245 | A1 * | 11/2019 | Miyai | B62D 1/195 |
| 2020/0031384 | A1 * | 1/2020 | Ponikiewski | B62D 1/195 |

FOREIGN PATENT DOCUMENTS

| | | |
|---|---|---|
| JP | 2006218916 A | 8/2006 |
| JP | 2011148354 A | 8/2011 |
| JP | 2014094700 A | 5/2014 |
| KR | 20030015621 A | 2/2003 |
| KR | 20050024779 A | 3/2005 |

OTHER PUBLICATIONS

Patents Act 1977: Search Report under Section 17(5), Application No. GB1705272.1, dated Sep. 14, 2017.

* cited by examiner

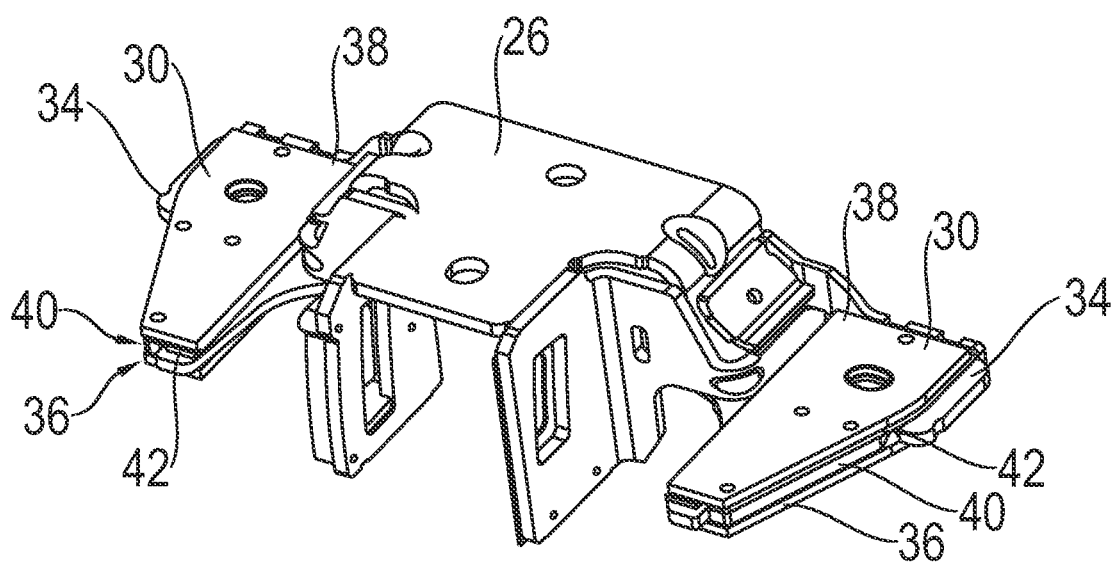
Fig. 2
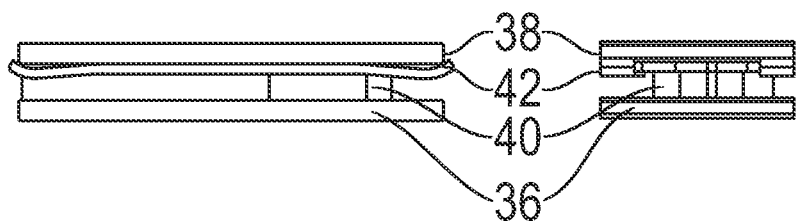
Fig. 3
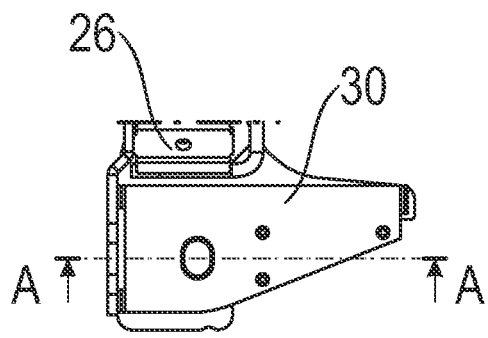 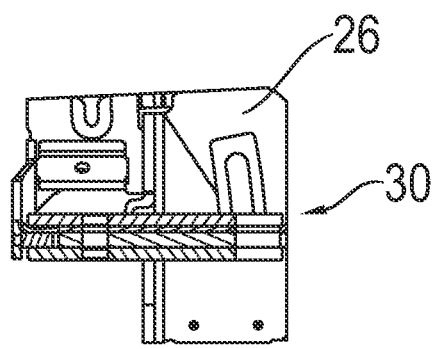
Fig. 4(A)　　　　　　　Fig. 4(B)

STEERING COLUMN ASSEMBLY

CROSS-REFERENCE TO RELATED APPLICATIONS

This application is a national stage of International Application No. PCT/EP2017/066814, filed 5 Jul. 2017, the disclosures of which are incorporated herein by reference in entirety, which claimed priority to Great Britain Patent Application No. 1705272.1, filed 31 Mar. 2017, the disclosures of which are incorporated herein by reference in entirety, and to European Patent Application No. 16461536.1, filed 7 Jul. 2016, the disclosures of which are incorporated herein by reference in entirety.

BACKGROUND TO THE INVENTION

This invention relates to steering column assemblies of the kind that permit the steering wheel to collapse in a controlled manner in the event of a crash by a controlled breakaway of a portion of the steering assembly from the mounting bracket that secures it to the main body of the vehicle.

It is known to provide a steering column assembly comprising a shroud that houses a steering shaft. The steering shaft connects a steering wheel to the road wheels of the vehicle allowing the driver to rotate the steering wheel in turn to move the road wheels. The connection may be through a rack and pinion gearbox, and to assist the driver a hydraulic or electric assistance may be provided. In the case of electric assistance a motor will act upon the steering shaft or a part of the steering between the shaft and the road wheels to apply a torque in the same sense as that applied by the driver.

The shroud may be non-adjustable in a simple arrangement in which it is fixed directly to a support bracket that is secured to the vehicle body, for instance to a beam that extends across the vehicle behind the dashboard. In other cases it may be adjustable for rake or reach or both rake and reach. This may be achieved by connecting the shroud to a support bracket though an adjustable clamp mechanism, the support bracket in turn being fixed to the mounting bracket. During adjustment the clamp assembly is released and the shroud can be moved up or down, or along, the support bracket.

To improve safety, it is known for the shroud to be telescopic so that in the event of a crash where the driver is thrown onto the steering wheel it can collapse and allow the wheel to move with the driver. This requires the shroud to be normally fixed to the vehicle body so it cannot move during normal use but able to break away and move in the event such a crash occurs. To achieve this it is known to secure the shroud, or the support bracket fixed to the shroud, to the mounting bracket using one or more breakaway capsule assemblies. These are designed to provide a rigid connection during normal use but to breakaway when a predetermined load is applied to them. Once broken, the shroud can move relative to the mounting bracket. An energy absorbing mechanism may be provided to absorb the energy associated with the movement so that one broken the movement is controlled.

The present invention aims to ameliorate some of the problems that may arise in the design or use of a steering assembly of the kind described above in which the shroud is able to move in a crash by the breakaway of one or more capsules.

SUMMARY OF THE INVENTION

According to a first aspect of the invention there is provided a steering assembly comprising a mounting bracket that in use is secured to a vehicle body, a support bracket secured to a steering column shroud, and a breakaway capsule assembly that includes a frangible connector that secures the breakaway capsule assembly to the support bracket, the breakaway capsule assembly in use providing a location point for a fixing that secures the support bracket to the mounting bracket, the steering assembly being arranged such that in the event of a crash the frangible connector breaks allowing the support bracket to move relative to the mounting bracket, in which the breakaway capsule assembly comprises a fixing portion that overlaps and supports a corresponding portion of the support bracket, the fixing portion including an opening which is aligned with a corresponding opening in the support bracket, the frangible connector passing through and engaging the two aligned openings, and characterised by further comprising at least one spring that biases the fixing portion and the support bracket into engagement with each other thereby to oppose any movement between the fixing portion and the support bracket in the axial direction of the frangible connector during use of the steering assembly.

The applicant has appreciated that the provision of a spring may enable all clearances in both the axial and vertical directions between the capsule and support bracket to be eliminated, and also eliminate movement that may arise during use, improving the performance of the assembly. Possible improvements include the remove of slack that could produce noise and a modification of the natural frequency of the steering assembly.

The spring may comprise a part of the breakaway capsule assembly and may act between a rigid part of the breakaway capsule assembly and the support bracket to apply the required biasing force. The spring may apply a force of at least 100N to the support bracket, and preferably at least 200N or at least 400N.

The spring may comprise a leaf spring that is bent out of its free resting position when the breakaway capsule is secured to the support bracket, thereby generating the required spring force.

Other types of spring could be used, for instance a resilient element that is compressed when in a position of use.

The fixing portion may be secured to, or an integral part of, a rigid member that defines the location point for the fixing of the breakaway capsule to the support bracket. The fixing portion may comprise a terminal part of a first rigid plate that defines the location point, although it need not be a plate and could be any suitably sized and shaped rigid member. This first rigid plate may extend from a front of the capsule assembly to the rear end. Providing the rigid plate that is secured to the support bracket by the fixing portion defines a strong fixed support from the support bracket, which sits upon this rigid plate at the fixing portion.

There may be more than one fixing portion, each at spaced locations, to provide multiple regions of support for the support bracket. The breakaway capsule assembly may therefore define further fixing portions, spaced apart from the first, which also overlaps a corresponding portion of the support bracket and support the support bracket. A further spring may be associated with each of these additional fixing portions to bias the fixing portions into engagement with the support bracket. They may each comprise parts of a single rigid member, for example of a first rigid plate.

In a most preferable arrangement, three fixing portions may be provided, two at the front end of the breakaway capsule and one at the rear. By rear we mean the end that is further from the steering wheel of the steering assembly when in use, the front being at the opposite end.

The fixing portions may each comprise terminal portions of a first rigid plate, which may form a base of the breakaway capsule assembly. Two of the fixing portions may be located at the front and one at the rear.

The breakaway capsule may further include a second rigid plate or member and a spacer that is sandwiched between the first rigid plate and the second rigid plate, the second rigid plate defining regions that overlap the support bracket on an opposing face to that which the fixing portions of the first plate overlap. The spacer may also comprise a generally planar plate. The spacer need not be rigid, but it is convenient if it is incompressible or substantially incompressible to ensure the spacing between the first and second plates is maintained. To reduce unwanted noises, the surface of the spacer should provide a good contact at all points with the facing surfaces of the first and second plates.

In an alternative the spacer may be an integral part of the first rigid plate or element, or an integral part of the second rigid plate or element.

The spring or springs may be secured to the first rigid member or a part of the first rigid member. However for ease of construction it is preferred that the springs are located in a space between the first rigid plate and the second rigid plate where provided, acting between the second rigid plate and the support bracket. The springs may therefore be separate from, but secured to, the remainder of the breakaway capsule assembly.

The spring or springs most conveniently comprise portions of a flexible plate that is secured to the remainder of the breakaway capsule, for instance sandwiched between the first and second plates. The plate may be sandwiched between the second plate and the spacer where provided.

Alternatively, the springs may be a part of the second plate so that no additional spring plate is needed.

The spring may therefore comprise a leaf spring which may comprise a part of a flexible portion of a third plate that is sandwiched between the second plate and the first plate. The third plate may be sandwiched between the second plate and the spacer.

The leaf spring may comprise an arm that extends from a main body portion of the third plate. The arm may be located at an end of the third plate.

In fact, the breakaway capsule assembly may comprise a single element that is shaped to define the fixing portion and the leaf spring (or multiple fixing portions and leaf springs where provided). It is, however, likely to be simpler and lower cost to produce the breakaway capsule from a stack of plates and according such an arrangement is preferred. This allows different thicknesses of plate to be used for the flexible spring or more rigid anchor points for the fixing bolt.

The first and second plates may be independent or may be integrally formed, perhaps as two portions of a single U-shaped member. For instance, this may comprise a plate which is folded at one end to provide the two overlapping plates.

The first and second rigid plates may comprise substantially planar. The plates may be steel plates or another metal or non-metal, and may be between 3 mm and 5 mm thick.

The edges of the first and second plates may extend beyond the edges of the optional spacer to form at least one guide channel that retains and guides a feature of the support bracket during a collapse.

The breakaway capsule assembly may comprise one or more connecting welds or rivets that secure the stack of plates and the spacer together.

The frangible connector may comprise a stem that passes through the openings in the fixing portion and support bracket and an enlarged head portion that acts upon the face of the fixing portion that faces away from the support bracket, the spring acting on the opposing side of the mounting portion.

The stem may comprise a plastic material and also the head which may be integral to the stem. A retaining portion may be provided on the opposite end of the stem, spaced from the head by a distance equal to the length of the two aligned openings.

The fixing that secures the capsule assembly to the mounting bracket may comprise a bolt having a head and a threaded stem and the capsule may include a bore that passes through the stacked first and second plates and the spacer at the location point. The bolt in a position of use passes through the aligned bore in each plate whilst the head of the bolt is sized too large to pass through. In use this bore may be aligned with a thread bore in the support bracket that engages the threaded stem of the bolt.

The steering assembly may comprise two breakaway capsule assemblies of the kind described above, one provided on each side of an imaginary vertical plane that contains the long axis of the shroud. Each may be secured to the support bracket by an appropriate fixing means, for example a bolt as described above. The two breakaway capsules may be mirror images of each other but otherwise identical.

The skilled person will appreciate of course that the shear strength of the fixing bolt, or combined shear strength of the two or more bolts, must be higher that the break force of the frangible pin or pins to ensure the pin or pins break before the bolt(s).

The steering assembly may include a shroud, which is secured to the support bracket, and a steering shaft that is located within the shroud and in use is connected at one end to a steering wheel of the vehicle.

The support bracket may be an integral part of the shroud. Alternatively, it may be secured to the shroud through a clamp assembly that in a clamped condition prevents relative movement between the support bracket and shroud and in an unclamped condition permits movement of the shroud required for at least one of rake and reach adjustment of the steering assembly.

The shroud may be telescopic having an upper shroud part and a lower shroud part and the support bracket may be secured to only one part. The upper part may be the part that is closest to the steering wheel. One part may be telescopically located at least partially within the other part.

The steering assembly may include an energy absorbing mechanism that acts between the shroud or support bracket and the mounting bracket to absorb energy in a crash and control relative movement of the shroud and the mounting bracket after the frangible pin has broken.

According to a second aspect of the invention there is provided a method of assembly of a steering assembly according to the first aspect of the invention comprising: aligning the main body relative to the support bracket; drilling a hole through the overlapping rigid plate and the aligned portion of the support bracket; and inserting the frangible pin into the aligned holes so formed.

The method may further comprise securing the main body to the mounting bracket using a bolt of other fastening.

According to a third aspect the invention provides a breakaway capsule assembly for use in the apparatus of the first aspect or method of the second aspect comprising Other advantages of this invention will become apparent to those skilled in the art from the following detailed description of the preferred embodiments, when read in light of the accompanying drawings.

BRIEF DESCRIPTION OF THE DRAWINGS

FIG. 2 is a view in perspective of the support bracket and the breakaway capsule assemblies secured to it;

FIG. 3 is view (a) from the side and (b) the front of one of the two breakaway capsule assemblies;

FIG. 4 is a view (a) from above and (b) the side of one capsule assembly secured to the support bracket;

DETAILED DESCRIPTION OF THE INVENTION

Figure 1:
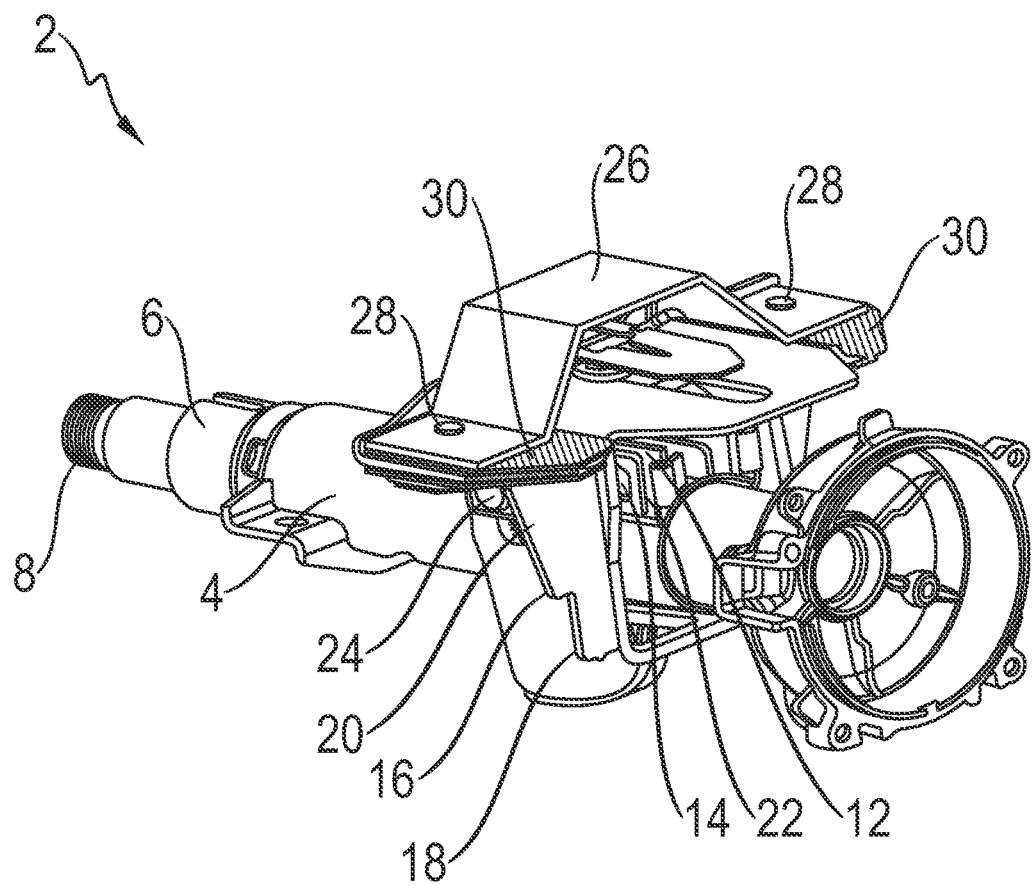
FIG. 1 is a perspective view of an exemplary steering column assembly that falls within the scope of the present invention.

A steering assembly 2 in accordance with the present invention is shown in FIG. 1. The assembly comprises a two part telescopic shroud having an upper tubular shroud portion 4 and a lower tubular shroud portion 6. The lower portion 6 fits inside the upper portion 4 in this example. A telescopic steering shaft 8 fits within the shroud where it is supported by a pair of bearing assemblies. One end of the shaft 8 is provided with splines that in use engage a splined bore in a steering wheel boss.

Secured to the upper portion 4 is an elongate rail 12 that is provided with a slot 14 that extends along the axis of the shroud. The rail 12 is located between two depending arms 16 of a support bracket 18. Each arm 16 is also provided with a generally vertically extending slot 20. A clamp mechanism 22 secures the shroud to the support bracket 18 and includes a clamp pin 24 that passes through the slots 20 in both arms 16 and the slot 14 in the rail 12. When clamped the clamp mechanism 22 squeezes the arms 16 onto the rail 12 so the shroud cannot move. When unclamped the arms 16 are released from the rail 12 and the clamp pin 24 can move along the slots 14, 20 to allow either rake or reach adjustment. The skilled person will appreciate that this is not essential to the invention, and the bracket 18 could in fact be simply fixed to the shroud so that no adjust can be made.

The shroud is secured to the vehicle body at a point near the end furthest from the steering wheel by a pivot axle, and when adjusted for rake the shroud pivots around this axle. The shroud is fixed in position by the support bracket 18 being secured to a mounting bracket 26 that is in turn welded or bolted to the vehicle body. Typically this mounting bracket 26 will be fixed to a cross beam located behind the dashboard of the vehicle that it is fitted to.

The connection of the support bracket 18 to the mounting bracket 26 is made by a pair of connecting bolts 28 that pass through a breakaway capsule 30 that is in turn connected to the support bracket 18 by a frangible connector 32 in the form of a plastic pin. The breakaway capsule assembly 30 therefore provides a location point for the connecting bolt 28, the assembly being arranged such that in the event of a crash the frangible connector 32 breaks allowing the mounting bracket 26 to move relative to the support bracket 18.

In the example, as best seen in FIG. 2, there are two breakaway capsule assemblies 30, each one secured by a frangible pin 32 to a wing 34 that extends out from a side of the support bracket 18. The arrangement and assembly of the support bracket 18 and its breakaway capsules assemblies 30 to the mounting bracket 26 will now be described in conjunction with FIGS. 2 to 7 of the accompanying drawings.

Figure 6:
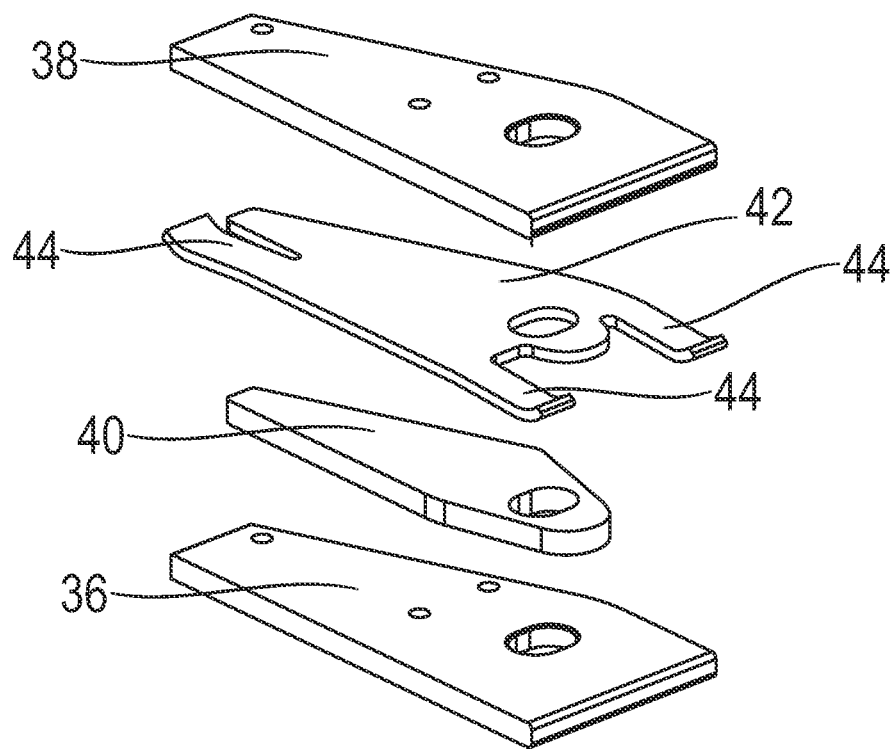
FIG. 6 shows the breakaway capsule assembly prior to assembly.
Figure 7:
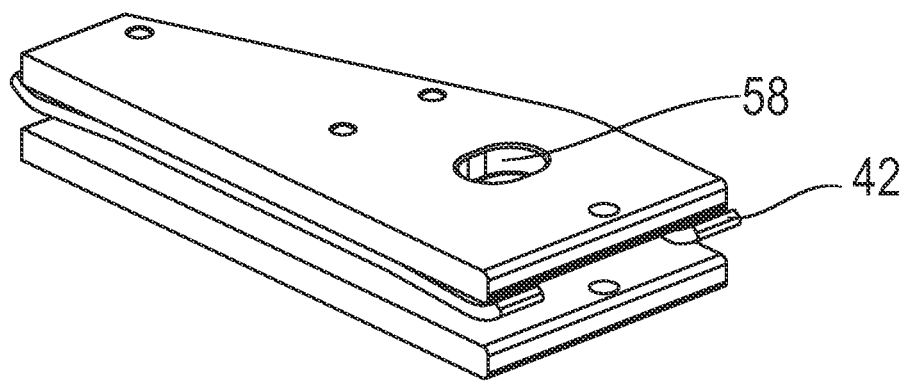
FIG. 7 shows the breakaway capsule assembly after assembly but before fitting to the support bracket

As shown in FIGS. 6 and 7, each breakaway capsule assembly 30 comprises a first plate 36 at the bottom of the capsule 30, a second plate 38 at the top of the capsule 30, a spacer 40 sandwiched between the two plates 36, 38 and a spring plate 42 sandwiched between the spacer 40 and the second plate 38. The first and second plates 36, 38 are relatively rigid; in this example steel plates which are of around 4 mm thickness and generally flat. The spacer 40 is also a metal plate with a thickness of around 4 mm and also flat. The sides of the spacer 40 are shaped so that in use they slide along features on the support bracket 18 so as to help guide the movement of the breakaway capsule assembly 30 relative to the support bracket 18. In fact, as shown in this example the first plate 36 and second plate 38 overhang the sides of the spacer 40 to form channels in which features of the support bracket 18 slide.

The spring plate 42 is a thinner more flexible steel plate or around 2 mm. The steel plate is generally flat but has three arms 44 extending from the ends that are bent to form leaf springs 46. Two arms 44 are provided at one end of the capsule assembly 30 and one at the other end. Both arms 44 are located between the second plate 38 and the first plate 36, clear of the spacer 40, and arranged so that there is a gap between each leaf spring 46 and the portion of first plate 36 that they face. The portions that face the spring 46 define fixing portions of the first plate 36 as will be explained.

The location of the three leaf springs 46 is selected so that the distance between leaf springs 46 is as large as possible to ensure that force acting on the support bracket 18 will be spread across a large distance to provide stable reinforcement and low pliancy on support bracket 18 and capsule 30 tolerances. The large distance allows lowering of the reaction forces acting on the capsule 30 which minimizes friction and improves crash performance. Making the wings 34 of the support bracket 18 relatively long and wide helps ensure the distances are large.

The four plates, when sandwiched together are secured by welds or rivets as shown in FIG. 7.

Figure 8:
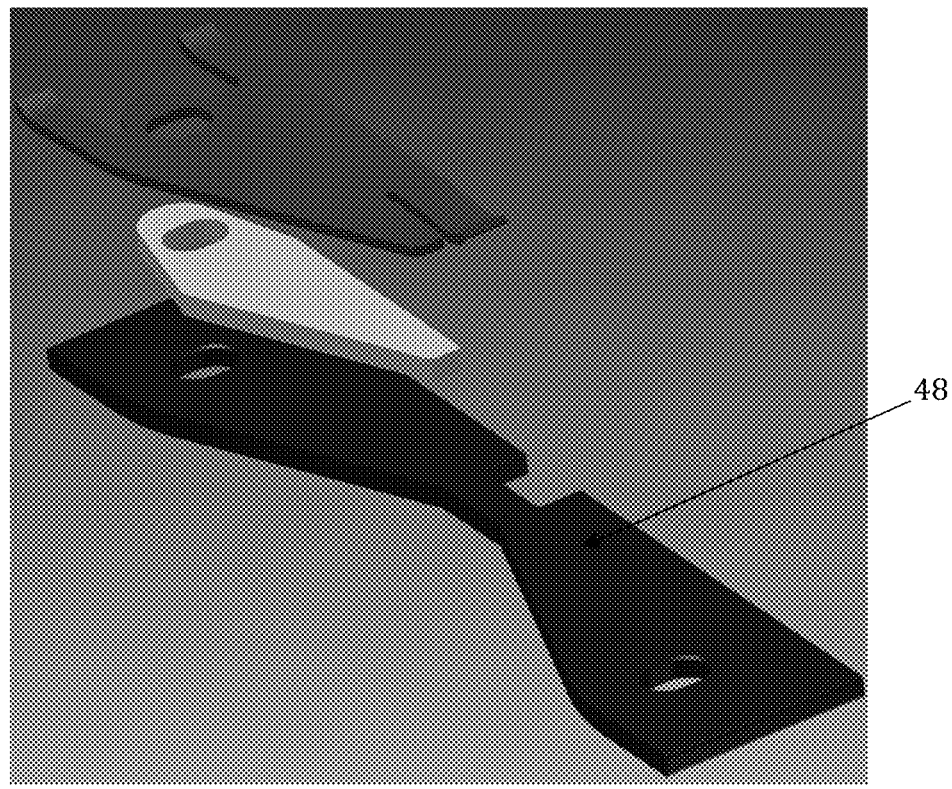
FIG. 8 shows the component parts of an alternative breakaway capsule assembly prior to assembly.
Figure 9:
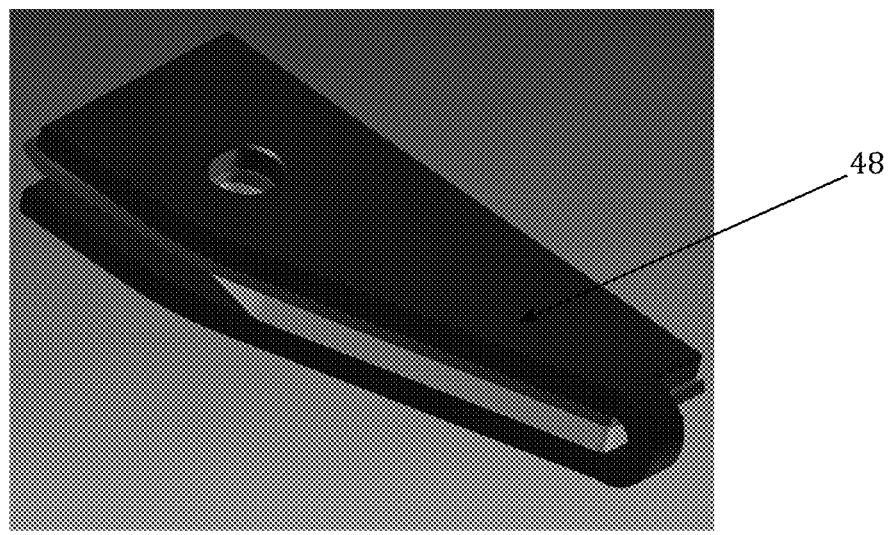
FIG. 9 is a view of the alternative breakaway capsule assembly after assembly but before fitting to the support bracket.

In a modification, shown in FIGS. 8 and 9, the first and second plates 36, 38 may comprise part of a single larger plate 48 that is folded back on itself at one end.

As best seen in FIGS. 2, 3, 4 and 5(c) the breakaway capsule assembly 30 is secured to the support bracket 18 such that a portion of the support bracket 18 overlaps a fixing portion 49 of the first plate 36. By choosing the thickness of the spacer 40 plus the spring plate 42 to exceed the thickness of the portion of the support bracket 18 that engages the fixing portion, the support bracket 18 can slide between the fixing portion and the leaf spring 46. The leaf spring 46 is shaped so that in this position it is deformed away from its free resting position, generating a reaction force that acts upon the support bracket 18 to pull the first plate 36 into engagement with the support bracket 18. This removes any free play that may otherwise be present between the first plate 36 and support bracket 18.

The three leaf springs 46 of each breakaway capsule assembly 30 apply a force of around 2000 N in total in the vertical direction on the support bracket 26 by pushing it down to the stiff/fixed first plate 36 which ensures solid, large supporting surface for the support bracket 18. Also column and steering wheel weight implies some force to the first plate 36. The use of the leaf springs 46 ensures all surface defects compensation may be achieved, a stable force around all column lifetime, and a good natural frequency performance.

Once located on the support bracket 18, the breakaway capsule assembly 30 is secured by a frangible connecting pin 32 that passes through a hole 52 in the first plate 36 that is aligned with a hole 54 in the support bracket 18.

Figure 5A:
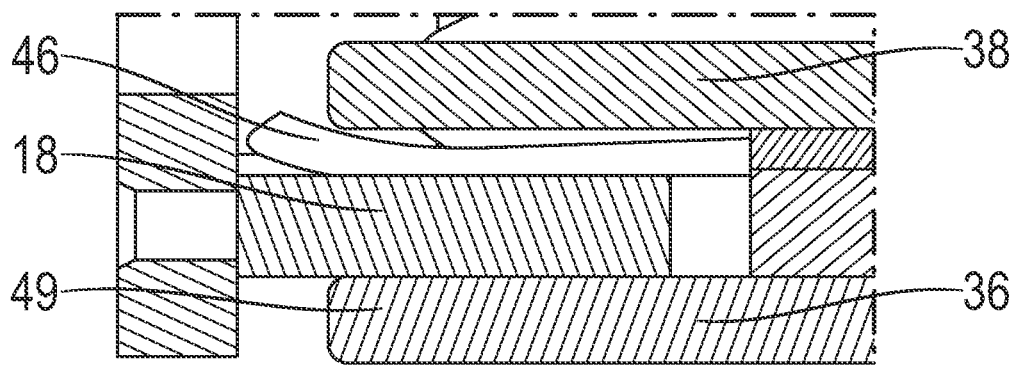
FIGS. 5(a) to (c) show the method of assembling the capsule assembly to the support bracket that falls within the scope of the second aspect of the invention.
Figure 5B:
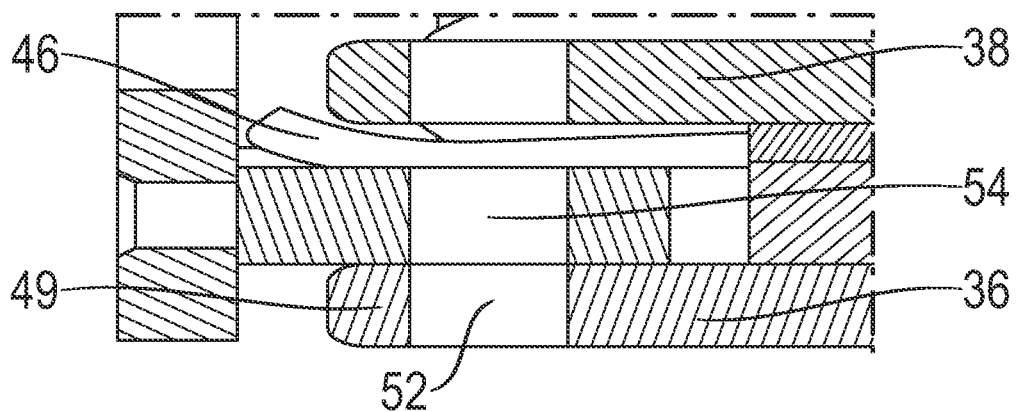
Figure 5C:
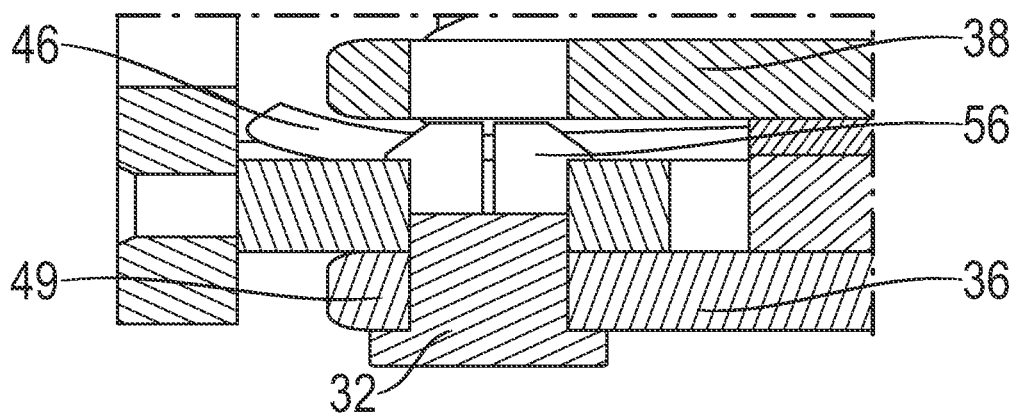

FIGS. 5(*a*) to (*c*) illustrate one method of assembling the capsules 30 to the support bracket 18. Initially as shown in FIG. 5(*a*) the breakaway capsule assembly 30 is positioned so that the first and second plates 36, 38 sandwich the support bracket 18 with the leaf spring 46 on top of the support bracket 18. A hole is then drilled through the first plate 36 and support bracket 18. This ensures that they are perfectly aligned. The hole 52 in the first plate 36 could of course be predrilled and act as a guide for drilling the hole 54 in the support bracket 18, possibly predrilled slightly undersize. Finally the frangible pin 32 is pressed into the two aligned holes 52, 54 so that the head of the pin 32 engages the exposed face of the first plate 36. As shown the pin 32 is prevented from removing by a retaining feature 56 on the end of the stem distal from the head.

During a crash the frangible pin 32 is cut between the upper surface of the first (lower) plate 36 and the support bracket 18 surface that is in contact with the fixing portion by shear force that occurs during a crash whilst the support bracket 18 is forced to slide out of the capsules 30. The pin 32 is therefore inserted from the bottom to achieve a perfect pin 32 cutting situation—the support bracket 18 being pushed down onto the fixing plate in the assembly shown in FIG. 1 by the torque acting on it during the crash situation.

The support bracket 18, once arranged as shown in FIG. 5, may then be fixed to the mounting bracket 26 by locating the bolts 28 that pass through the large hole 58 in each of the breakaway capsule assemblies 30.

In accordance with the provisions of the patent statutes, the principle and mode of operation of this invention have been explained and illustrated in its preferred embodiments. However, it must be understood that this invention may be practiced otherwise than as specifically explained and illustrated without departing from its spirit or scope.

The invention claimed is:

1. A steering assembly comprising: a mounting bracket that in use is secured to a vehicle body, a support bracket secured to a steering column shroud, and a breakaway capsule assembly that includes a frangible connector that secures the breakaway capsule assembly to the support bracket, the breakaway capsule assembly in use providing a location point for a fixing that secures the support bracket to the mounting bracket, the steering assembly being arranged such that in the event of a crash the frangible connector breaks allowing the support bracket to move relative to the mounting bracket, in which the breakaway capsule assembly comprises a fixing portion that overlaps and supports a corresponding portion of the support bracket, the fixing portion including an opening which is aligned with a corresponding opening in the support bracket, the frangible connector passing through and engaging the two aligned openings, and further comprising at least one spring that comprises a part of the breakaway capsule assembly and acts between a rigid part of the breakaway capsule assembly and the support bracket to bias the fixing portion and the support bracket into engagement with each other thereby to oppose any movement between the fixing portion and the support bracket in an axial direction of the frangible connector during use of the steering assembly.

2. The steering assembly as claimed in claim 1, wherein the at least one spring a force of at least 100N.

3. The steering assembly as claimed in claim 1, wherein the at least one spring comprises a leaf spring that is bent out of a free resting position thereof when the breakaway capsule assembly is secured to the support bracket, thereby generating the bias.

4. The steering assembly as claimed in claim 1, wherein the fixing portion comprises a terminal part of a first rigid plate that defines the location point.

5. The steering assembly as claimed in claim 4, wherein the first rigid plate extends from a front end of the breakaway capsule assembly to a rear end.

6. The steering assembly as claimed in claim 1, comprising more than one fixing portion, at spaced locations, for providing multiple regions of support for the support bracket.

7. The steering assembly as claimed in claim 6, wherein the breakaway capsule assembly defines further fixing portions, spaced apart from the first, which also overlap a corresponding portion of the support bracket and support the support bracket.

8. The steering assembly as claimed in claim 7, further comprising a further spring associated with each further fixing portion to bias the fixing portions into engagement with the support bracket.

9. The steering assembly as claimed in claim 8, wherein each further spring comprises parts of a single rigid member.

10. The steering assembly as claimed in claim 6, wherein three fixing portions are provided, two fixing portions being provided at a front end of the breakaway capsule assembly and one at a rear end.

11. The steering assembly as claimed in claim 6, wherein the fixing portions each comprise terminal portions of a first rigid plate.

12. The steering assembly as claimed in claim 11, wherein the first rigid plate forms a base of the breakaway capsule assembly.

13. The steering assembly as claimed in claim 11, wherein the breakaway capsule further includes a second rigid plate and a spacer that is sandwiched between the first rigid plate and the second rigid plate, the second rigid plate defining regions that overlap the support bracket on an opposing face to that which the fixing portions of the first rigid plate overlap.

14. The steering assembly as claimed in claim 13, wherein the spacer comprises a generally planar plate.

15. The steering assembly as claimed in claim 13, wherein the spacer is incompressible or substantially incompressible to ensure the spacing between the first and second rigid plates is maintained.

16. The steering assembly as claimed in claim 13, wherein the spacer is an integral part of the first rigid plate or an integral part of the second rigid plate.

17. The steering assembly as claimed in claim 13, wherein the at least one spring comprises portions of a flexible plate that is secured to the remainder of the breakaway capsule.

18. The steering assembly as claimed in claim 17, wherein the flexible plate is sandwiched between the first and second rigid plates.

19. The steering assembly as claimed in claim 18, wherein the flexible plate is sandwiched between the second rigid plate and the spacer.

20. A steering assembly comprising: a mounting bracket that in use is secured to a vehicle body, a support bracket secured to a steering column shroud, and a breakaway capsule assembly that includes a frangible connector that secures the breakaway capsule assembly to the support bracket, the breakaway capsule assembly in use providing a location point for a fixing that secures the support bracket to the mounting bracket, the steering assembly being arranged such that in the event of a crash the frangible connector breaks allowing the support bracket to move relative to the mounting bracket, in which the breakaway capsule assembly comprises a fixing portion that overlaps and supports a corresponding portion of the support bracket, the fixing portion including an opening which is aligned with a corresponding opening in the support bracket, the frangible connector passing through and engaging the two aligned openings, and further comprising at least one spring that comprises a leaf spring, the leaf spring being bent out of a free resting position thereof when the breakaway capsule assembly is secured to the support bracket, thereby generating a bias that biases the fixing portion and the support bracket into engagement with each other to oppose any movement between the fixing portion and the support bracket in an axial direction of the frangible connector during use of the steering assembly.

* * * * *